(12) United States Patent
Lota

(10) Patent No.: US 7,708,436 B2
(45) Date of Patent: May 4, 2010

(54) STORAGE COMPARTMENT WITH AN ILLUMINATED TRAY

(75) Inventor: Charan Singh Lota, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 42 days.

(21) Appl. No.: 11/970,584

(22) Filed: Jan. 8, 2008

(65) Prior Publication Data
US 2009/0175049 A1    Jul. 9, 2009

(51) Int. Cl.
*B60Q 1/00*    (2006.01)
*B60Q 1/26*    (2006.01)

(52) U.S. Cl. ........................ 362/488; 362/154

(58) Field of Classification Search ......... 362/154–156, 362/488
See application file for complete search history.

(56) References Cited

U.S. PATENT DOCUMENTS

| 5,590,945 A | 1/1997 | Simms |
| 5,915,832 A | 6/1999 | Baird, Sr. |
| 6,036,071 A | 3/2000 | Hartmann et al. |
| 6,193,399 B1 | 2/2001 | Hulse |
| 6,419,379 B1 | 7/2002 | Hulse |
| 6,550,940 B2 | 4/2003 | Kamiya et al. |
| 6,554,462 B2 | 4/2003 | Hulse et al. |
| 6,896,387 B2 | 5/2005 | Renfro |

FOREIGN PATENT DOCUMENTS

JP        2003-159978 A    *    6/2003

* cited by examiner

*Primary Examiner*—Sandra L O'Shea
*Assistant Examiner*—Jason Moon Han
(74) *Attorney, Agent, or Firm*—Gifford, Krass, Sprinkle, Anderson & Citkowski, P.C.

(57) ABSTRACT

According to one aspect of the invention, a storage compartment having an illuminating device mounted therein and a tray having a lens mounted thereon. The tray is movable within the storage compartment between a forward position and a rear position. The illuminating device may provide light to both the interior of the storage compartment and the tray depending upon the position of the tray.

10 Claims, 2 Drawing Sheets

STORAGE COMPARTMENT WITH AN ILLUMINATED TRAY

BACKGROUND OF THE INVENTION

1. Field of the Invention

This invention relates to a storage compartment having an opening for receiving objects, and a movable tray with a lens mounted thereon. More particularly, the invention relates to a storage compartment having an illuminating device for illuminating the interior of the tray when the tray's lens is positioned adjacent the illuminating device, and illuminating the interior of the storage compartment when the tray is positioned away from the illuminating device.

2. Description of the Prior Art

Storage compartments having an illuminating device for illuminating accessories such as a tray or a cup holder are known and disclosed in U.S. Pat. No. 6,419,379 to Hulse. Hulse uses a single bulb in combination with a waveguide to route light to the interior of a storage compartment. U.S. Pat. No. 6,193,399 to Hulse discloses an optical waveguide for illuminating the interior of a cup holder. The waveguide is disposed at the bottom of a cup holder and has an input device for connecting with the light source. U.S. Pat. No. 6,896,387 to Renfro discloses a system for illuminating a cup holder by having a clear acrylic disk seated at the bottom of a cup holder, and an LED lamp seated within the acrylic disk. However, it remains desirable to have a storage compartment having a device that can illuminate both the interior of the compartment and the compartment's accessory, depending upon the accessory's position within the storage compartment.

SUMMARY OF THE INVENTION AND ADVANTAGES

According to one aspect of the invention, a storage compartment having an illuminating device mounted therein and a tray having a lens mounted therein. The tray is movable within the storage compartment between a forward position and a rear position. The illuminating device may provide light to both the interior of the storage compartment and the tray depending upon the position of the tray.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figures 1, 2:
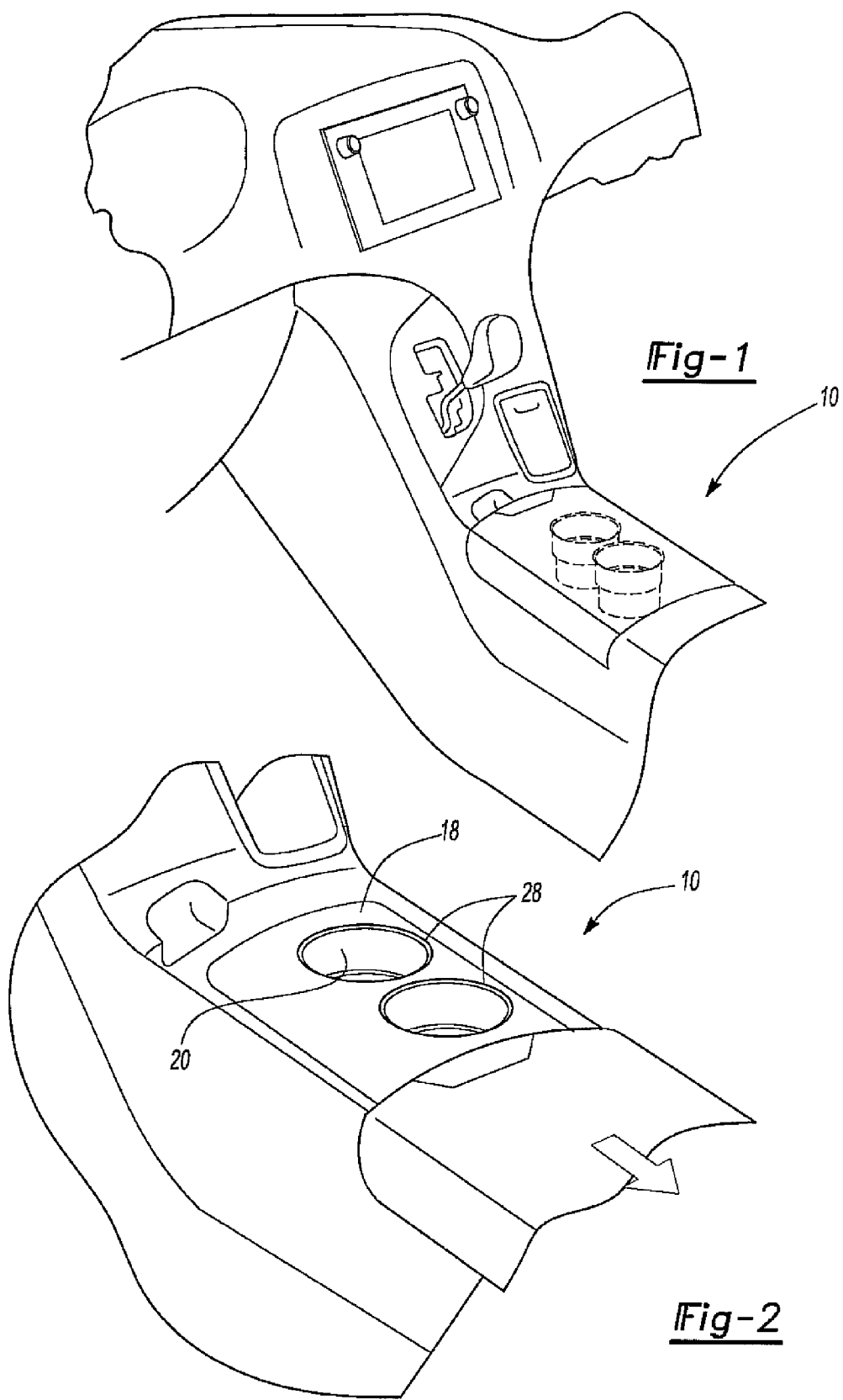
FIG. 1 is a perspective view of the storage compartment as used in a vehicle console wherein the storage compartment is covered by a sliding armrest.
FIG. 2 is a perspective view of the storage compartment having a tray including a pair of cup holders.

With reference first to FIG. 1, an embodiment of the storage compartment 10 is there shown in use with a vehicle console having a sliding armrest movable from a first position to a second position. The storage compartment 10 has an opening and is completely accessible to the user when the armrest is moved to the second position as shown in FIG. 2. The storage compartment 10 has a pair of illuminating devices 12 disposed in a recess 14 located on an interior wall 16 of the storage compartment 10, and a tray 18 having a wall 16 defining a cavity 20 and a lens 22 mounted thereon. The recess 14 may be formed to direct light emitted from the illuminating device 12. The light may be directed towards the floor of the storage compartment 10 to reduce the intensity of any light reflected towards the vehicle driver and passengers, and to focus the light to illuminate any auxiliary devices 24 that may be found within the storage compartment 10 such as a power outlet as shown in FIGS. 3, 4, and 5.

Figure 3:
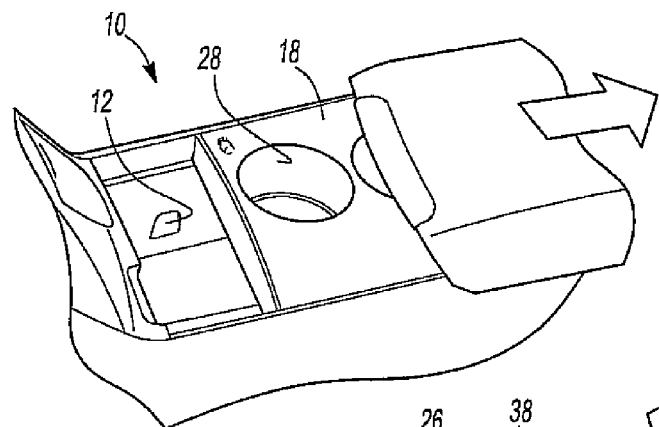
FIG. 3 is a perspective view of the tray moved from a forward position to an intermediate position, and showing one illuminating device exposed and providing illumination to the interior of the storage compartment, and the other illuminating device illuminating one of the cup holders.
Figure 4:
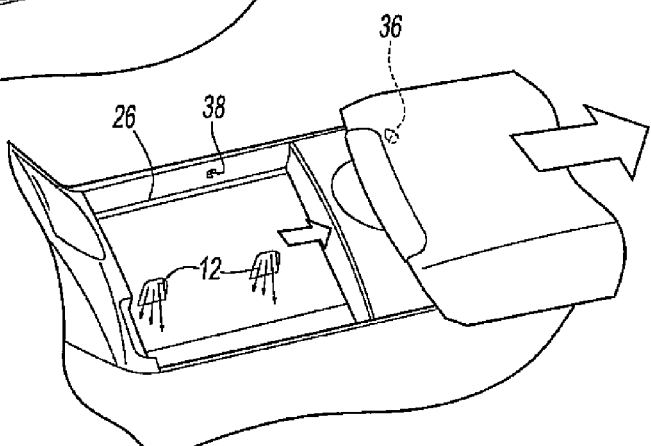
FIG. 4 is a perspective view of the tray moved to a rear position, and the pair of the illuminating devices illuminating the interior of the storage compartment.
Figure 5:
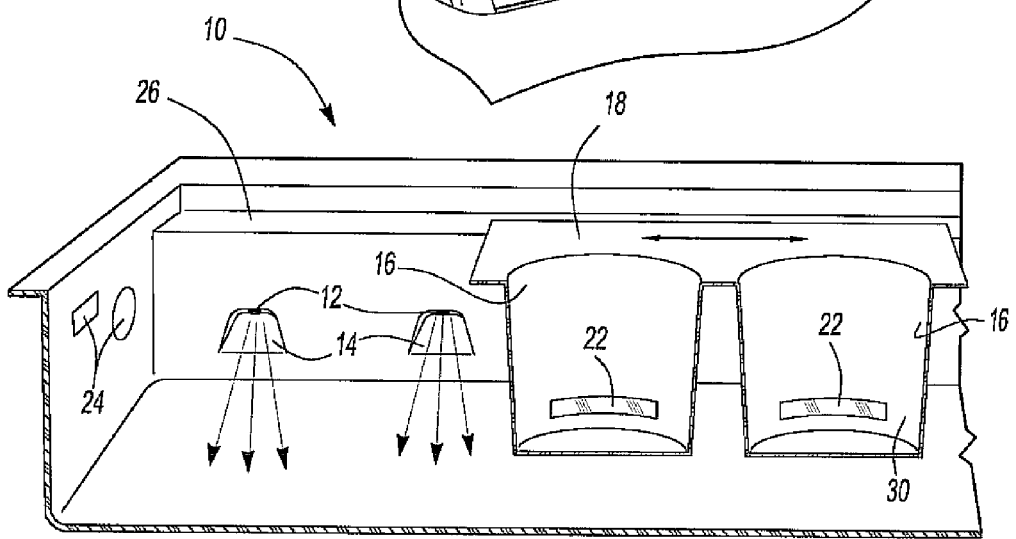
FIG. 5 is a cross-sectional view of FIG. 4 showing the illuminating devices illuminating auxiliary devices mounted within the storage compartment when the tray is in the rear position.
Figure 6:
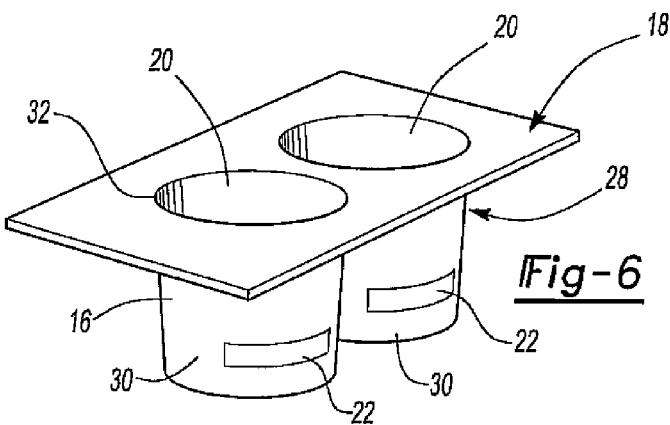
FIG. 6 is a perspective view of the tray including a pair of receptacle members and a lens disposed on each receptacle member.

The illuminating device 12 shown in FIGS. 3 and 4 is an LED, but it is anticipated that other illuminating devices 12 such as an optical waveguide or a bulb may be used. FIGS. 3, 4, and 5 show the pair of illuminating devices 12 arranged on the same horizontal plane along the length of the storage compartment 10, with one of the illuminating devices 12 spaced apart from the other The illuminating device 12 may be independently controlled by the user, or it may be linked to the vehicle's exterior lighting system such that the illuminating device 12 is turned on when the vehicle's headlights are turned on. In another embodiment, the illuminating device 12 is automatically turned on by using a sensor, such as a cadmium sulfide cell that detects the amount of illumination in the vehicle's interior.

The storage compartment 10 has a tray 18 movable within the storage compartment 10. In the embodiment shown, the tray 18 is movable along a rail system. The rail system extends along the vertical plane of the storage compartment 10. At certain points along the pair of rails 26, the lens 22 of the tray 18 will be registered to the illuminating device 12 and the cavity 20 of the tray 18 will be illuminated. In FIGS. 1-6, the tray 18 is configured to include a pair of receptacle members 28, such as a cup holder 28.

The tray 18 may be slid along the rail system between a forward position and a rear position as illustrated in FIGS. 2, 3, and 4. In the forward position, the tray 18 abuts against the forward portion of the storage compartment 10, and in the rear position, the tray 18 is stored underneath the sliding armrest. Lenses 22 are mounted to each cup holder 28. Each lens 22 is made of a transparent material such as glass or a hardened plastic, and is mounted in a segment 30 of each of the cup holders 28. The lens 22 allows light from the illuminating device 12 to illuminate a portion 32 of the interior of the cup holder 28 when the segment 30 in which the lens 22 is mounted is adjacent and spaced apart from an illuminating device 12. The lens 22 may be grained or otherwise treated to help control the diffusion of light passing therethrough.

The tray 18 includes a latching mechanism 34 that works to help a user position the tray 18 such that the lenses 22 are registered to the illuminating devices 12. The latching mechanism 34 may be a latch 36 which cooperates with a plurality of notches 38 disposed along one of the pair of rails 26. Each rail 26 is disposed opposite walls 16 of the storage compartment 10, and extends along a vertical plane. The notches 38 may be placed along either of the rails 26 where the cup holder 28 would be positioned adjacent and opposite to an illuminating device 12. Accordingly, when the latch 36 is positioned in front of a notch 38, a spring 40 (not shown) may urge the latch 36 into the notch 38 thereby registering the lens 22 to an illuminating device 12. FIGS. 1 and 2 show the tray 18 in the forward position and both lenses 22 registered to an illuminating device 12 thereby allowing each of the illuminating devices 12 to illuminate an interior portion 32 of the corresponding cup holders 28.

FIG. 3 shows the tray 18 moved in an intermediate position along the rails 26 and the latch 36 engaged in a notch 38. In this intermediate position the forward most cup holder 28 lens 22 is registered with the rearward most illuminating device 12. The forward most illuminating device 12 is then free to illuminate the interior of the storage compartment 10 while the rearward most illuminating device 12 is registered to the lens 22 in forward most cup holder 28 and illuminating a portion 32 of said cup holder 28. In this intermediate position, the lens 22 of rearward most cup holder 28 is not registered to any illuminating device 12.

FIG. 4 shows the tray 18 in the rear position, and the pair of illuminating devices 12 not registered to any lens 22. In such a position, the pair of illuminating devices 12 illuminates the interior of the storage compartment 10. Accordingly, a user may be able to easily access the tray 18 in the dark as the illuminating device 12 and the lens 22 work in concert with each other to provide light to the tray 18. Furthermore, the configuration described allows the user to have that same light illuminate the interior of the storage compartment 10 by moving the tray 18 to a position where an illuminating device 12 is exposed thus making more readily accessible auxiliary devices 24 and objects within the storage compartment 10. Thus it will be appreciated by those skilled in the art that any number of illuminating devices 12 and receptacle members 28 may be used in the storage compartment 10 disclosed. Thus it is anticipated that the tray 18 may not even have a cup holder 28, but a portion 32 in which a lens 22 is mounted wherein the lens 22 when registered to an illuminating device 12 illuminates a portion 32 of the tray 18.

Obviously, many modifications and variations of the present invention are possible in light of the above teachings and may be practiced otherwise than as specifically described while within the scope of the appended claims.

What is claimed is:

1. A storage compartment, the storage compartment comprising:
    a pair of opposing side walls each having an inner wall surface, a front wall, a rear wall, and a floor, wherein the side walls are fixedly disposed on opposite ends of the floor and each of the pair of side walls extends between respective ends of the rear and front walls so as to define an opening opposite the floor, wherein the opening has a longitudinal axis extending between the front and rear walls, and wherein the inner wall surfaces are in communication with the opening;
    at least one illuminating device mounted to the inner wall surface of one of the pair of side walls; and
    a tray disposed within the opening of the storage compartment, wherein the tray is slidably mounted to the inner wall surfaces of each of the pair of opposing side walls so as to extend between the pair of opposing side walls, the tray movable along the longitudinal axis of the opening between a forward position wherein the tray is in contact with the front wall and a rear position wherein the tray is in contact with the rear wall, the tray having a wall, the wall bounding an area so as to hold articles therein, and at least one lens mounted on the wall of the tray, the at least one lens passing light from the at least one illuminating device into the area defined by the wall when the tray is positioned adjacent the at least one illuminating device.

2. A storage compartment as set forth in claim 1 including a pair of illuminating devices, the pair of illuminating devices mounted to the inner wall surface of one of the pair of side walls along a generally horizontal plane, one of the pair of illuminating devices being spaced apart from the other of the pair of illuminating devices.

3. A storage compartment as set forth in claim 1 wherein the wall of the tray is configured to hold at least one beverage container.

4. A storage compartment as set forth in claim 3 wherein a portion of the wall is spaced apart from the illuminating device.

5. A storage compartment as set forth in claim 4 wherein the at least one lens is mounted in the portion of the wall that is spaced apart from the illuminating device.

6. A storage compartment as set forth in claim 1 further including a pair of rails, each of the pair of rails being opposite and parallel the other, wherein the pair of rails are disposed along opposite sides of the opening, and wherein the tray is slidable along the pair of rails.

7. A storage compartment as set forth in claim 1 further comprises a latching mechanism operable to fix the tray along the opening of the storage compartment so as to register the at least one lens to the at least one illuminating device.

8. A storage compartment as set forth in claim 7 further including a plurality of notches, wherein the latching mechanism is operable to selectively engage one of the plurality of notches so as to register any one of the at least one lens to one of the at least one illuminating device.

9. A storage compartment as set forth in claim 1 further including a recess disposed along the inner wall of one of the side walls of the storage compartment, the recess housing the at least one illuminating device, and wherein the recess is configured to direct light from the at least one illuminating device downwardly toward the floor of the storage compartment.

10. A storage compartment having a pair of opposing side walls each having an inner wall surface, a front wall, a rear wall, and a floor, wherein the side walls are fixedly disposed on opposite ends of the floor and each of the pair of side walls extend between respective ends of the rear and front walls so as to define an opening opposite the floor, wherein the opening has a longitudinal axis extending between the front and rear walls, and wherein the inner wall surface of each of the pair of side walls is in communication with the opening, the storage compartment comprising:
    a pair of illuminating devices mounted to the inner wall surface of one of the pair of side walls, wherein the pair of illuminating devices are disposed along a horizontal plane;
    a recess, disposed within the storage compartment, the recess housing the pair of illuminating devices, wherein the recess is configured to direct the light from each of the pair of illuminating devices towards the floor;
    a plurality of notches disposed along the opening of the storage compartment;
    a pair of rails, one of the pair of rails being opposite and parallel the other, the pair of rails being disposed along the opening of the storage compartment; and
    a tray having a latching member, the latching member having a latch for mating with the plurality of notches, wherein the tray is disposed within the opening of the storage compartment between the pair of rails, and wherein the tray is slidably mounted to the pair of rails so as to move along the longitudinal axis of the opening between a forward position and a rear position, wherein in the forward position the tray is in contact with the front wall and wherein in the rear position the tray is in contact with the rear wall, the tray further including a wall, the wall bounding a first area and a second area so as to hold a pair of beverage containers spaced apart from each other, the tray further including a pair of lenses, wherein one of the pair of lenses is in communication with the first area and the other of the pair of lenses is in communication with the second area, and wherein both of the pair of illuminating devices are operable to emit light into respective first and second areas of the tray when the tray is in the forward position, and wherein both of the pair of illuminating devices are operable to shine light onto the floor of the storage compartment when the tray is in the rear position, and wherein one of the pair of illuminating devices is operable to emit light into the first area of the tray and the other of the pair of illuminating devices is operable to emit light onto the floor of the storage compartment when the tray is selectively placed between the forward and the rear position.

\* \* \* \* \*